United States Patent [19]

Heater, Jr.

[11] 4,446,271

[45] May 1, 1984

[54] BODY SOLDER OF POWDERED ALUMINUM AND A POLYESTER

[75] Inventor: Paul L. Heater, Jr., Massillon, Ohio

[73] Assignee: The Goodyear Tire & Rubber Company, Akron, Ohio

[21] Appl. No.: 432,205

[22] Filed: Oct. 1, 1982

[51] Int. Cl.$^3$ .............................................. C08K 3/08
[52] U.S. Cl. .................................... 524/441; 524/605
[58] Field of Search ................................ 524/441, 605

[56] References Cited

U.S. PATENT DOCUMENTS 4,195,000 3/1980 Charles et al. ...................... 524/605

FOREIGN PATENT DOCUMENTS 54-68856 6/1979 Japan .................................... 524/441

Primary Examiner—Lewis T. Jacobs
Attorney, Agent, or Firm—J. D. Wolfe; R. D. Thompson

[57] ABSTRACT

A body solder composed of a blend of 20 to 70 percent by weight of powdered aluminum in a thermoplastic polyester having a melting point of 200° to 220° C. The preferred solders have powdered aluminum with a particle size of from 0.2 to 150 microns and the polyester contains dimerates.

1 Claim, No Drawings

BODY SOLDER OF POWDERED ALUMINUM AND A POLYESTER

TECHNICAL FIELD

This invention relates to a lead free solder suitable as a body solder for vehicles comprising low intrinsic viscosity, high melting point, low glass transition temperature polyester having incorporated therein a suitable amount of powdered aluminum to give the solder sag resistance. More particularly this invention relates to a body solder composed of a thermoplastic, high melting point, low glass transition temperature polyester blended with about 20 to 70 percent by weight of powdered aluminum.

BACKGROUND

The major automobile manufacturers have used a lead based body solder to fill depressions in car bodies such as between the roof and rear fenders before the car bodies are painted. These solders generally are alloys of lead with tin or antimony. These solders have a temperature melting range that permits the solder to be melted and applied to the body with a spatula before the solder solidifies. On cooling the solder solidifies and can be sanded smooth to a feathered edge before painting.

The metals in this solder, viz lead, tin and antimony, are of high atomic weight and generally considered to be highly toxic. Consequently the automobile companies and others have attempted to develop body solders of an organic base that were free of these metals.

DISCLOSURE AND PRACTICE OF THE INVENTION

I have discovered that a thermoplastic polyester having a melting point of about 200° to 220° C. can have incorporated therein sufficient powdered aluminum to give a composition that is sufficiently fluid at relatively high temperature to be applied to a vertical section of automobile body without appreciable flow or sag and on cooling can be sanded to a feather edge to fill cracks or blemishes in an automobile surface preferably is able to be painted with the body as it moves through the paint and bake cycle of the assembly line. Thus this composition of a thermoplastic polyester having a low glass transition temperature and a high melting point containing about 20 to 70 and preferably 25 to 35 percent by weight of powdered aluminum, preferably of 0.2 to 150 micron particle size can be used as a body solder for automobiles.

Also this new body solder is easy to make as the thermoplastic polyester to be melted and the powdered aluminum is mixed in by suitable stirring means such as hand stirring until a uniform mixture is obtained, or alternatively they can be blended and melted to form the solder. Where large quantities of solder is desired, a preferred method would be to blend the thermoplastic polyester with the aluminum powder in an extruder, preferably equipped with an explosion proof facility. The extrudate contains the powdered aluminum uniformly mixed in the molten polyester.

The metal of the automobile body to be soldered can be prepared in any of the well known methods such as sanding or etching the solder is applied by a spatula, brush or gun. Likewise the metal surface can be primed with suitable metal primers such as the particularly preferred epoxy primers, i.e. one containing a solvent or emulsion of an epoxy resin and a hardener for the epoxy resin, representative hardness being amine, amide and borate hardners.

The nature of this invention can be more readily understood by reference to the following examples wherein all parts and percentages are by weight unless otherwise indicated.

EXAMPLE 1

One kilo of a commercial poly(ethylene terephthalate/dimerate) copolyer containing a mol ratio of 85/15 terephthalate to dimerate and having a melt temperature, $T_m$, of 221° C. and a glass transition temperature, $T_g$, of 13° C. was placed in a glass reactor and melted. Then 30 to 40 percent by weight of powdered aluminum was blended incrementally in very small amounts, into aliquots of the copolymer at 250° C. under a nitrogen atmosphere to obtain the solder as a uniform mixture. This mixture was tested as a solder using standard metal Q panels that are used for powder coating testing. The use of nitrogen is a safety aspect where large amounts of powder are to be mixed.

The metal Q panels were impacted with a Gardner Impact Tester to produce six "dimples" 0.3 by 1.6 centimeters in the panels. These dimples or depressions were filled with the molten solder and leveled with a spatula and heated above the softening point of the solder viz about 200° to 220° C. or higher to achieve adhesion on cooling. The cooled solder on the metal Q panel was sanded with a disc sander on a electric drill using emery cloth as the abrasive. A No. 80 grit emery was used first, followed by No. 120 and No. 320 grit emery cloths to give an automobile finish to the panel having the usual feathered edges.

The sanded panels were painted and placed in the bake oven at about 200° C. for 45 minutes and were observed to be satisfactory when removed from the oven.

The sanded panels passed the impact test for 15 inch pounds with a Gardner Impact Tester. Thus this solder forms a hard sandable, impact resistant filler or solder for automobile bodies which may be painted with an automobile paint or enamel.

EXAMPLE 2

The thermoplastic polyesters of Table I which have good flexibility, sufficient resistance to fatigue checking and sufficient impact to pass the impact test are representative of those that may be used to make the solder of this invention.

TABLE I

| Copolyester | $T_m$ °C. | $T_g$ °C. |
|---|---|---|
| 85/15 E/T/D | 221 | 13 |
| 90/10 E/T/D | 234 | 28 |
| 75/25 E/T/D | 195 | −6 |
| 85/15 TeM/T/D | 191 | −3 |

E/T/D designates copolyester of ethylene glycol (E) with terephthalic acid (T) and dimer acid (D) having ratio of T to D shown whereas Tem designates tetramethylene glycol copolyester of ratio shown instead of ethylene glycol ones.

A metal Q panel was painted with an epoxy metal primer composed of methylene chloride dispersion of epichlorhydrin bis phenol A type epoxy resin and boron hardener and heated to cure the primer.

The body solders made with the polyesters of Example 2 have high adhesion values for the epoxy resin primed panels relative to the unprimed ones.

EXAMPLE 3

The solder of Example 1 was applied to metal test plates containing dimples impacted therein. Some of the metal test panels were coated with a commercial epoxy primer and some were not. The solder was spread on the metal test panels and cured at about 250° C. Some of the panels were sanded to a feather edge. All the panels were placed in a cold room at −20° C. for ten days. The samples removed from the cold room exhibited no adverse temperature affect. The samples which had not been sanded prior to exposure in cold room could be sanded to a feather edge without any cracks developing.

I claim:

1. A body solder composed of a blend of 20 to 70 percent by weight of a powdered aluminum having a particle size of from 0.2 to 150 microns and a thermoplastic polyester having a melting point of 200° to 220° C., said polyester being a copolyester of the phthalates and contains from 10 to 35 percent by weight of dimerate.

* * * * *